(No Model.)
G. W. McNEAR.
CAR CONSTRUCTION.
No. 463,071. Patented Nov. 10, 1891.
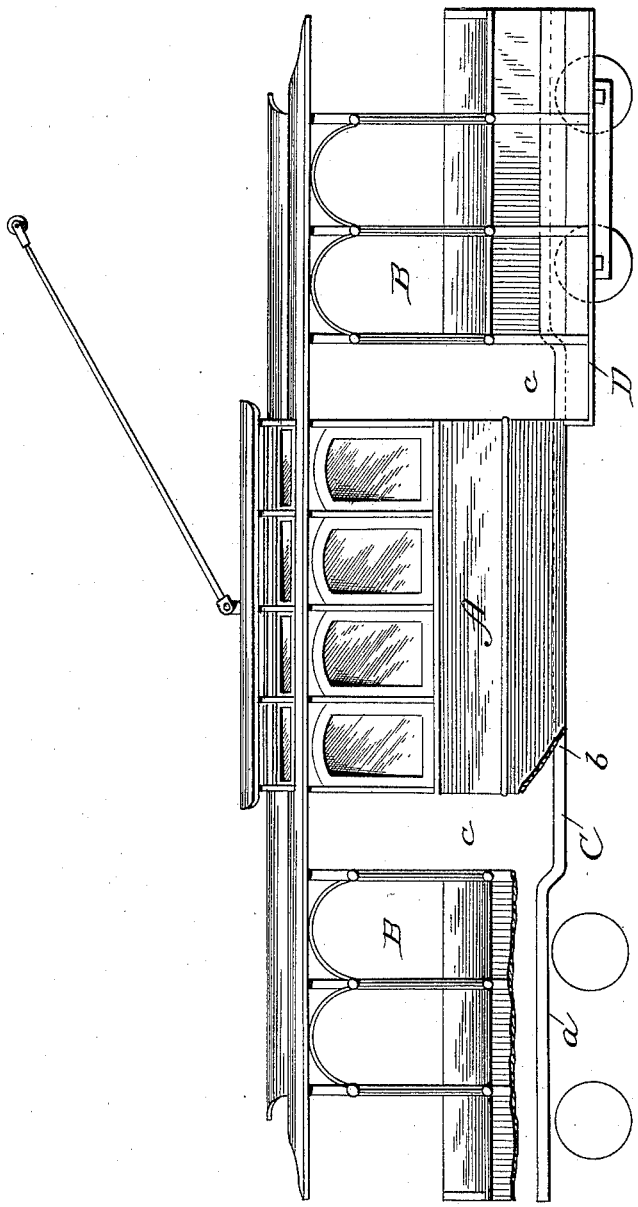
Attest
Wallin Donaldson
J. W. Spear
Inventor
George W. McNear
by Spear & Seely
Attys

UNITED STATES PATENT OFFICE.

GEORGE W. McNEAR, OF OAKLAND, CALIFORNIA.

CAR CONSTRUCTION.

SPECIFICATION forming part of Letters Patent No. 463,071, dated November 10, 1891.

Application filed July 8, 1891. Serial No. 398,836. (No model.)

*To all whom it may concern:*

Be it known that I, GEORGE W. MCNEAR, a citizen of the United States, and a resident of the city of Oakland, county of Alameda, State of California, have invented certain new and useful Improvements in the Construction of Railway-Cars; and I do hereby declare that the following is a full, clear, and exact description of the same.

This invention relates to an improvement in the construction of cars especially adapted for use upon electric railways. The most recent type of cars of this class is of the "combination" class, having an intermediate closed compartment and an open space or "dummy" at each end provided with seats for passengers and an aisle for the operator. Access to the interior of the middle compartment is by a transverse passage adjacent to each end of the latter and through ordinary doors in such ends. These cars are very long and heavy, and on both of these accounts are always supported upon a swiveled truck or "bogie" under each dummy. In electric cars, in order to afford room under the car for the motor and driving-gearing, the wheels are made much larger than in ordinary cable cars, frequently being as much as thirty inches in diameter; and a car of this class having a plane flooring above the top of these wheels throughout its extent is difficult of access to women and children on account of the high step from the foot-board to the floor. This inconvenience only exists in cars having the double dummy with intermediate entrance for passengers, for in single-dummy cars, entered at one end like an ordinary horse-car, the platform is always narrower than the main body of the car, and space is left for two steps on a side, if necessary. It is impracticable, however, to provide the dummy-compartments with two foot-boards because the lower one would project too far into the street or the space between the tracks.

The object of my invention, therefore, is to so change the construction of the car as to allow the flooring to be depressed below the wheels so as to facilitate entering the car from the side and still employ the single foot-board.

My invention consists of a car having a side sill or beam elevated at its ends so as to clear the wheels of both trucks, and depressed intermediately so as to bring the flooring down to its lowest level.

The invention will be fully understood by reference to the following detailed description, and the accompanying drawing, which represents a side elevation of a car, partly broken away to show my construction.

While my device is intended for use on electric cars, I have shown none of the electrical motive apparatus, as it forms no part of the invention.

The car is of the combination double-dummy type, having the central closed compartment A and the open dummies B B at the ends. The central compartment is also open in "summer-cars," in such cases being provided with a center aisle and transverse seats.

C represents one of the longitudinal sills or beams which extend throughout the length of the car and form the main portions of its frame-work. These sills are usually of steel rolled into a U or I cross-section, and, as shown in the drawing, are formed with elevated ends $a$ and a depressed intermediate portion $b$, the latter being as long as the center compartment of the car, plus the width of the transverse entrance-passages $c$. The elevated ends of the sills are high enough to give a good clearance for the car-wheels and permit the trucks to swing freely on curves. The flooring of the car supported by these sills is therefore elevated in the dummy-compartments above the level of that of the center compartment and of the transverse entrance passages $c$, so that from the foot-board D it is an easy step to such passage. In summer-cars, open throughout at the sides, the foot-board would extend the whole length. Its relation, however, to the floor-level of the central part of the car would be the same as to the entrance-passages just described.

Practical operation of electric cars built in accordance with this invention has demonstrated its convenience and utility for cars of this type, and the advantages obtained by its use appear so obvious as to require no detailed description.

While I have described my invention as particularly adapted to electric cars, it is evident that it may be applied to cable cars supported on bogie-trucks, thus permitting the use of larger wheels on such cars than are now commonly employed.

Having described my invention, I claim—

A car comprising a central compartment with an open dummy at each end and having transverse side entrances for passengers, the flooring of said side passages and central compartment being depressed below the level of that of the dummies, substantially as and for the purposes set forth.

In testimony whereof I have hereunto affixed my signature, in the presence of two witnesses, this 24th day of June, 1891.

GEORGE W. McNEAR.

Witnesses:
  JAMES L. KING,
  L. W. SEELY.